United States Patent [19]

Lindemann et al.

[11] 3,944,291
[45] Mar. 16, 1976

[54] ANTISKID BRAKE CONTROL SYSTEM AFFORDING ACCELERATION CONTROL OF A SKIDDING WHEEL RUNNING ON A LOW ADHESION ROADWAY

[75] Inventors: Lindemann, Hannover; Lutz Weise, Misburg; Dieter Luhdorff, Hannover, all of Germany

[73] Assignee: WABCO Westinghouse GmbH, Hannover, Germany

[22] Filed: July 11, 1974

[21] Appl. No.: 487,677

[30] Foreign Application Priority Data
Oct. 3, 1973 Germany............................ 2349681

[52] U.S. Cl.................................. 303/21 A; 303/20
[51] Int. Cl.²........................................... B60T 8/08
[58] Field of Search ............ 188/181 A; 303/20, 21; 307/10 R; 317/5; 324/162; 340/53, 62, 262

[56] References Cited
UNITED STATES PATENTS

| | | | |
|---|---|---|---|
| 3,674,318 | 7/1972 | Hickner et al...................... | 303/21 A |
| 3,677,609 | 7/1972 | Davis et al....................... | 303/21 BE |
| 3,734,573 | 5/1973 | Davis et al........................ | 303/20 X |
| 3,790,227 | 2/1974 | Dozier.............................. | 303/21 P X |
| 3,832,013 | 8/1974 | Davis et al........................ | 303/21 P |
| 3,833,270 | 9/1974 | Gotz et al....................... | 303/21 BE |

*Primary Examiner*—Trygve M. Blix
*Assistant Examiner*—Stephen G. Kunin
*Attorney, Agent, or Firm*—R. W. McIntire, Jr.

[57] ABSTRACT

A vehicle antiskid brake control system in which a low threshold acceleration signal is formed in addition to the normal acceleration signal to withhold the reapplication of brake pressure an extended duration following a wheel skid correction to allow sufficient time for an accelerating wheel to reach substantial synchronous speed before braking is resumed when running on a roadway affording such a poor adhesion characteristic as to preclude attainment of a normal rate of wheel acceleration. On a roadway affording a good adhesion characteristic the low threshold acceleration signal is automatically prevented from influencing the antiskid system and the reapplication of brake pressure is instead influenced according to the normal acceleration signal.

1 Claim, 3 Drawing Figures

ANTISKID BRAKE CONTROL SYSTEM AFFORDING ACCELERATION CONTROL OF A SKIDDING WHEEL RUNNING ON A LOW ADHESION ROADWAY

BACKGROUND OF THE INVENTION

Figure 1:
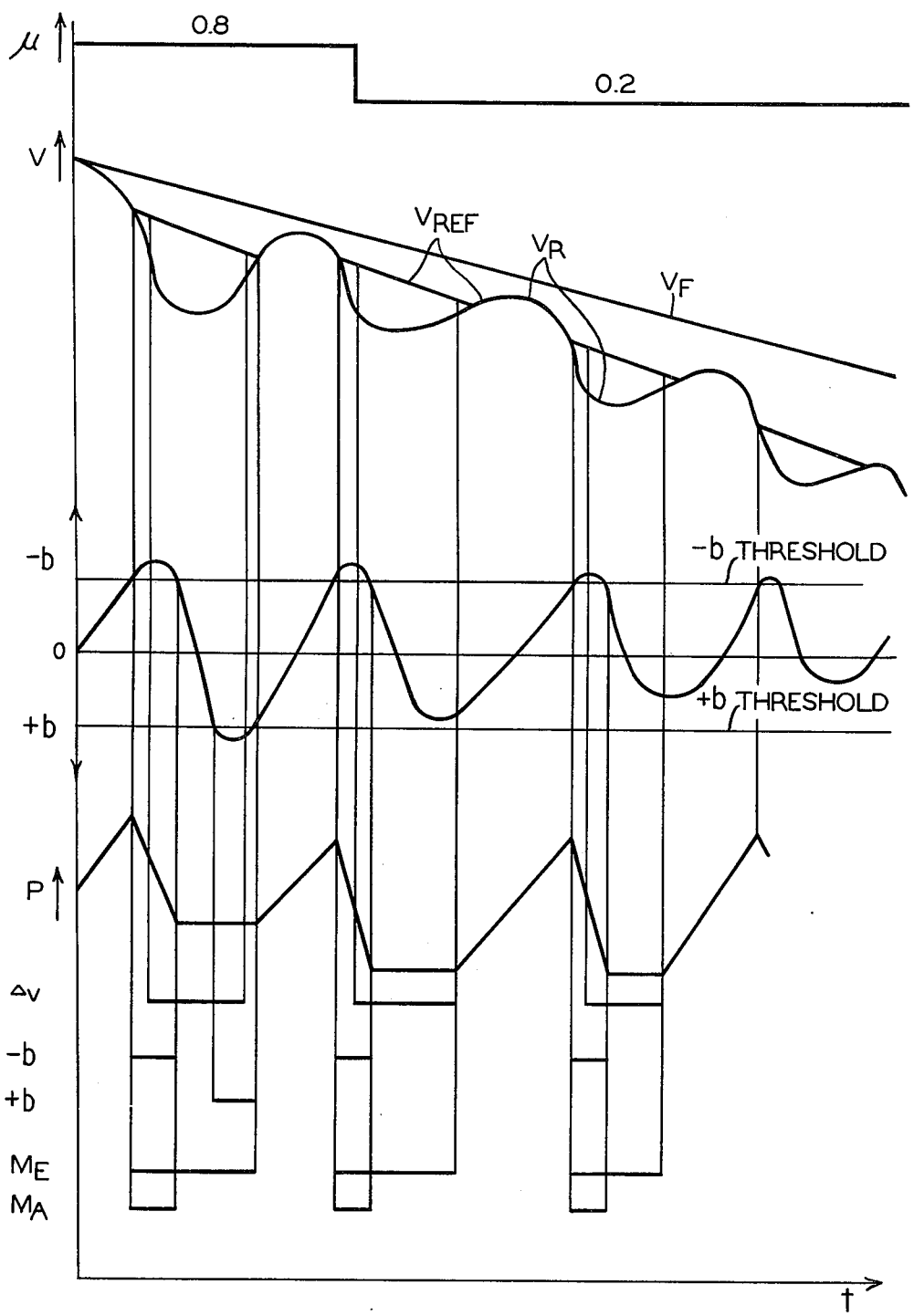

The present invention is concerned with a vehicle wheel antiskid brake control system of the type in which a reference velocity signal approximating the vehicle speed is generated for comparison with an individual wheel speed signal to obtain a velocity signal $\Delta V$ when a predetermined difference exists therebetween. The velocity signal $\Delta V$ is used in the antiskid system to control the reapplication of brake pressure at the individual wheel following a skid thereof. The reference velocity signal $V_{REF}$, represented in the velocity curve of FIG. 1, is formed in accordance with a speed voltage arising from at least one wheel of the vehicle when the wheel is accelerating at a speed $V_R$ above the reference velocity signal and when decelerating at a rate below a preselected skid threshold. When the deceleration rate exceeds the skid threshold, a special memory circuit functions such that only a gradual decay of the reference voltage signal $V_{REF}$ occurs from a value corresponding to the wheel speed $V_R$ at the time the wheel deceleration exceeds the skid threshold. Normally, this would result in only a slight deviation between the reference velocity signal $V_{REF}$ approximating the vehicle velocity and the actual vehicle velocity signal $V_F$ before the velocity signal $\Delta V$ disappears to establish the reapplication of brake pressure. The inertia of the reaccelerating wheel will thus allow the wheel speed to approach the vehicle speed before another cycle of wheel skid control is initiated so that the reference velocity signal $V_{REF}$ remains a fairly true approximation of the actual vehicle velocity $V_F$ throughout the wheel skid brake control cycle.

On roadways having a low coefficient of friction, however, such as experienced by a vehicle traveling on an ice covered road, the reacceleration of a wheel following a wheel skid is, of course, relatively slow so that by the time the velocity signal $\Delta V$ disappears to establish the reapplication of brake pressure, the wheel speed is still relatively low. Accordingly, another cycle of wheel skid control will be initiated before the wheel speed $V_R$ is restored to a level sufficient to reestablish the reference velocity signal $V_{REF}$ as an accurate approximation of the vehicle velocity $V_F$. It will be appreciated, therefore, that following several cycles of wheel skid control operation, a considerable deviation between the actual vehicle velocity $V_F$ and reference velocity signal $V_{REF}$ will have been accumulated such that the wheel speed $V_R$ will eventually become zero, while the vehicle is still moving. Since the reference velocity signal $V_{REF}$ is generated as a function of the wheel speed, it also will now be essentially zero so that the non-rotating state of the wheel will be undetected and the wheel will remain locked in a skid condition in spite of the antiskid brake control system.

Summary of the Invention

It is therefore the object of the present invention to prevent this gradual lock-up of a vehicle wheel by providing means for sensing a slow acceleration of a wheel following a wheel skid for the purpose of delaying the reapplication of brake pressure until the wheel speed and consequently the reference velocity signal more closely approximate the actual vehicle speed.

In one embodiment of the invention, the output of a first timer that is activated by a deceleration signal disables an auxiliary circuit via which a first acceleration signal is transmitted to a wheel evaluation control circuit in parallel with a second acceleration signal generated at a higher rate of wheel acceleration than the first acceleration signal. If the second acceleration signal arises before the time period of the timer expires following disappearance of the deceleration signal, a second timer will be activated to maintain the bypass circuit disabled after the time period of the first timer expires. The second acceleration signal is effective to influence the reapplication of brake pressure via the evaluation control circuit, in the usual manner.

In the event the second acceleration signal fails to appear before expiration of the first timer, as for example when the vehicle wheel is running on a road surface having a low coefficient of adhesion, then the timer output disappears and the auxiliary circuit becomes enabled to pass the first acceleration signal to the evaluation control circuit to influence the reapplication of brake pressure in the sense that the reapplication is delayed to allow the wheel speed to increase for a longer period so as to more closely approximate the vehicle speed and thus provide for the generation of a more accurate reference velocity signal during each cycle of antiskid brake control.

In another embodiment of the invention, the ability of a skidding wheel to reaccelerate following correction of the wheel skid is determined by the brake pressure present at the time a deceleration signal arises, rather than the time required to obtain an acceleration signal following correction of the wheel skid. The signal from a pressure switch subject to brake pressure is conducted by a flip-flop device when set to a predetermined state by a deceleration signal at the time of a wheel skid to either disable the auxiliary circuit when the pressure switch is closed indicative of normal road adhesion or to enable the auxiliary circuit to transmit the first acceleration signal to the evaluation circuit when the pressure switch is open indicative of a road having a low adhesion characteristic. In the latter instance, the first acceleration signal delays the reapplication of brake pressure to allow the wheel to accelerate to a speed more closely approximating the vehicle speed, as in the first embodiment.

Figure 2:
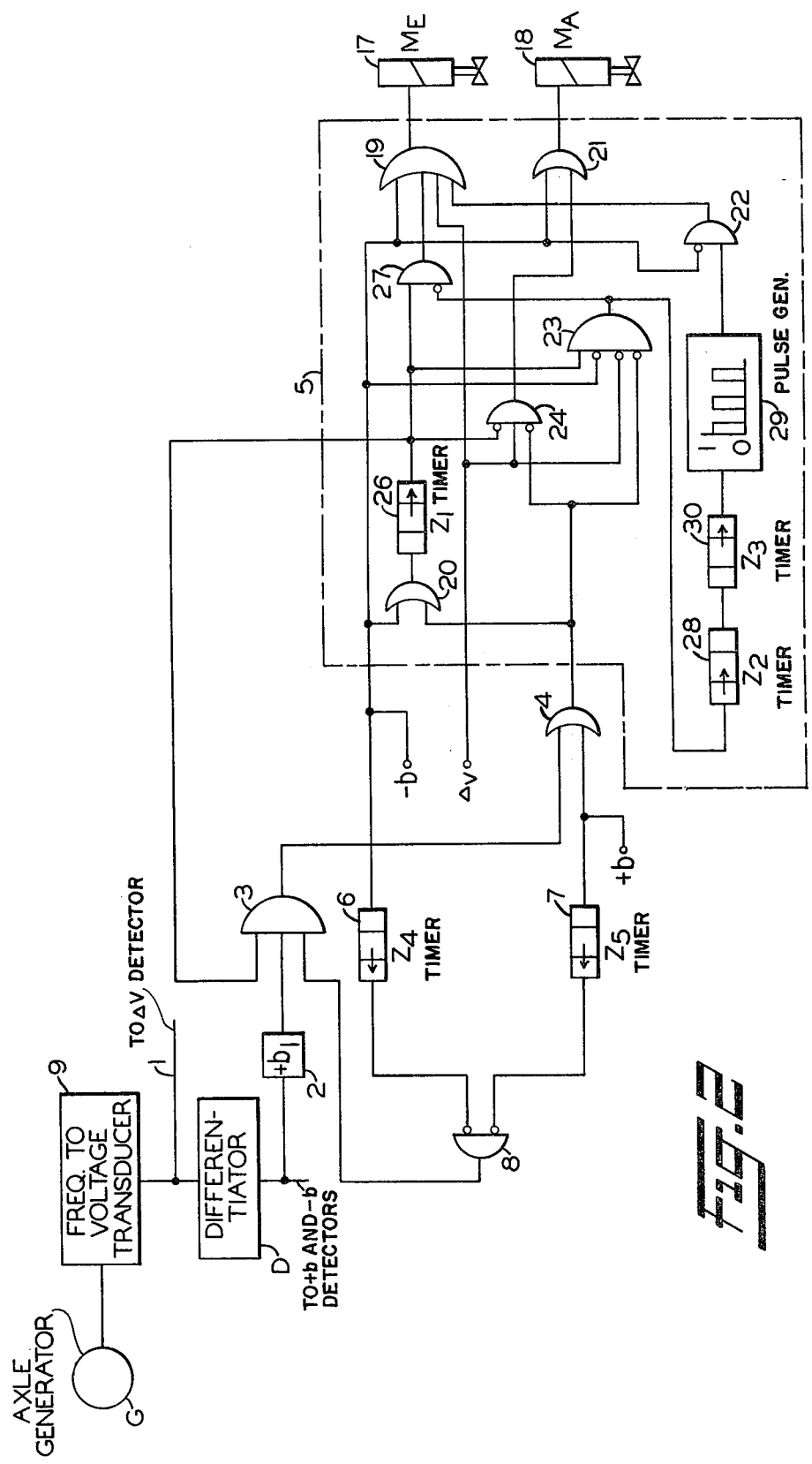
Figure 3:
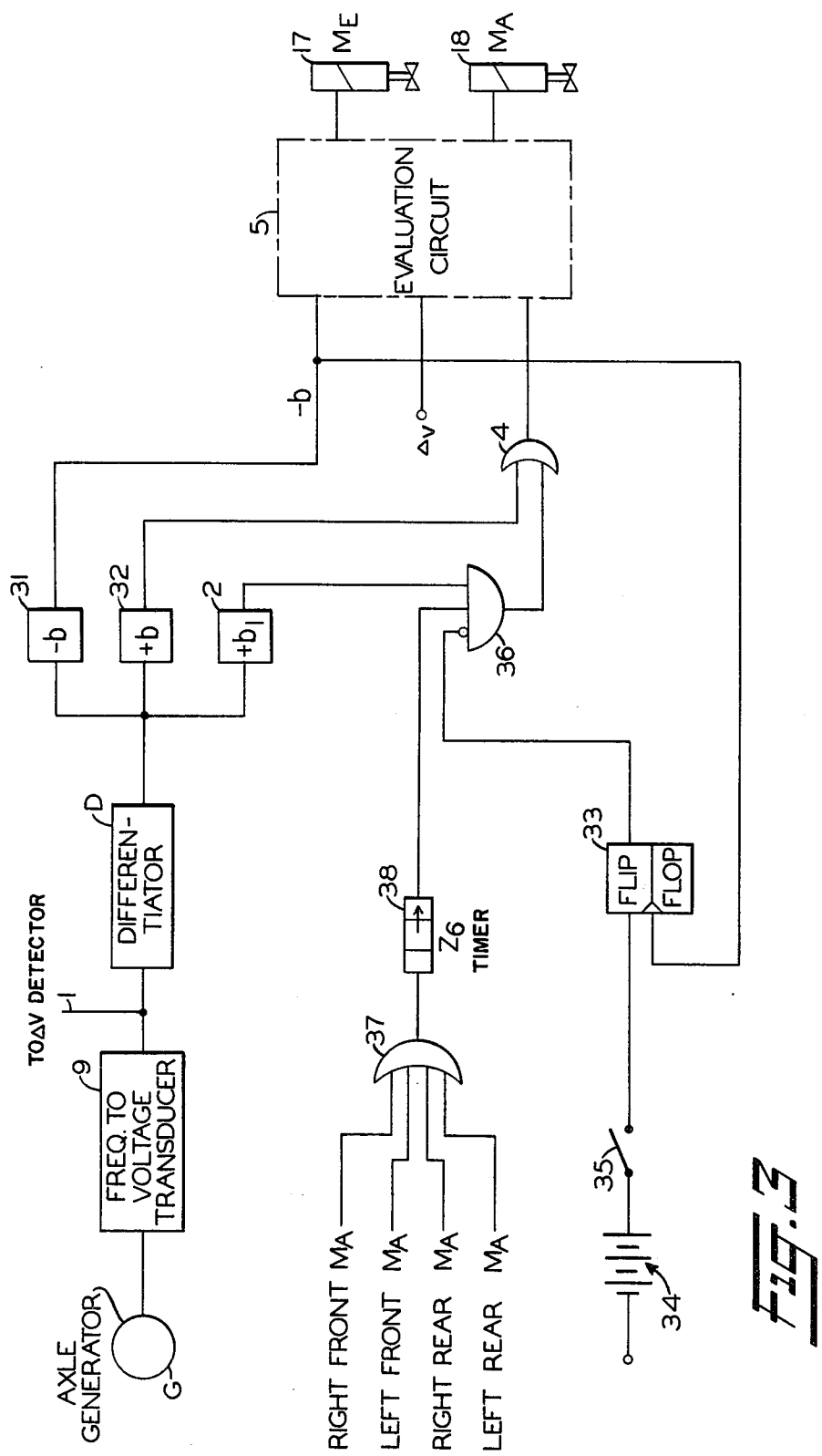

Other objects and advantages of the invention will become apparent as the following, more detailed description proceeds with reference to the accompanying drawings of which:

FIG. 1 shows a series of time referenced velocity, acceleration and pressure curves formed under two levels of road adhesion for the purpose of illustrating the disadvantage of an antiskid control system not having the benefit of the present invention;

FIG. 2 shows an antiskid brake control system arranged in accordance with one embodiment of the invention wherein an additional wheel acceleration signal is formed for the purpose of influencing the antiskid control system as a function of time; and FIG. 3 shows an antiskid brake control system in accordance with an alternate embodiment in which the influence of an additional wheel acceleration signal upon the antiskid control is a function of brake pressure.

DESCRIPTION AND OPERATION

Referring now to FIG. 2, the antiskid brake control system for a vehicle wheel includes an axle generator device G, which may be a well known type whose pulsed output signals have a frequency proportional to the angular velocity of the wheel being monitored, and are connected to the input of a frequency to voltage transducer 9. Transducer 9 may be a well known type that develops a d.c. output voltage that varies in amplitude according to the frequency of the input pulses, so as to provide a speed signal that is proportional to the rotational speed of the wheel.

The conductor 1 carries this speed signal to a conventional threshold detector (not shown), which develops a velocity signal $\Delta V$ when the speed signal of a wheel becomes a predetermined percentage less than a wheel speed generated reference velocity signal $V_{REF}$, as shown in FIG. 3. It is well known in the art that in selecting the higher speed of at least two wheels or through special memory circuitry when utilizing a single wheel speed, the wheel speed generated reference velocity signal $V_{REF}$ represents an approximation of the vehicle velocity. In parallel with the threshold detector is a differentiator circuit D to which the wheel speed signal emitted by transducer 9 is also connected via conductor 1. By the well known process of differentiation, the wheel speed signal is converted to a rate signal, which may be positive or negative in sense according to whether the wheel acceleration is of increasing or decreasing character, respectively.

These rate signals emitted by differentiator D are connected to additional threshold detectors (also not shown) for developing a deceleration signal $-b$ when a decreasing wheel acceleration exceeds a preselected value likely to produce a wheel skid and an acceleration signal $+b$ when an increasing wheel acceleration exceeds a preselected value at which a skidding wheel may be considered to have substantially regained synchronous rotation when running on a road having a relatively high coefficient of friction.

Since the acceleration rate at which a wheel actually does regain synchronous rotation obviously varies with the frictional characteristic of the road surface at the time, the rate signal emitted by differentiator D is connected to still another threshold detector 2 for developing an additional low threshold acceleration signal $+b_1$, when an accelerating wheel exceeds a rate considerably lower than the rate corresponding to acceleration signal $+b$. This latter acceleration signal $+b_1$ will therefore arise when a wheel is accelerating on a road having a low coefficient of friction, as well as one having a high coefficient of friction.

The output of threshold detector 2, which may be a conventional Schmitt Trigger circuit, is connected to one input of an AND gate 3, while an OR gate 4 is subject at one input to the output of AND gate 3 and at the other input to the acceleration signal $+b$. The output of OR gate 4 is connected to a logic control circuit 5, which evaluates the dynamic wheel condition according to this acceleration signal (either $+b$ or $+b_1$), as well as deceleration signal $-b$ and velocity signal $\Delta V$, also connected to logic circuit 5.

The deceleration signal $-b$ and acceleration signal $+b$ are also connected to a timer 6 and a timer 7, respectively, whose outputs are each connected to different inverted inputs of an AND gate 8. The output of AND gate 8 is connected to a second input of AND gate 3.

At logic circuit 5, the $-b$ signal is connected directly to one input of an OR gate 19, an OR gate 20, an OR gate 21 and to an inverted input of an AND gate 22 and an AND gate 23.

The $\Delta V$ signal is fed directly to another input of the OR gate 19 and the input of an AND gate 24, as well as to an inverted input of AND gate 23.

The output signal of OR gate 4 (either $+b$ or $+b_1$) is connected directly to another input of the OR gate 20, as well as to another inverted input of the AND gate 23 and 24.

The signal emitted by OR gate 20 is transmitted to a timer 26, whose output signal is fed to an input of an AND gate 27, AND gate 23 and AND gate 3, as well as to another inverted input of AND gate 24 for a duration exceeding the duration of the timer input from OR gate 20.

The output signal emitted by AND gate 23 is transmitted simultaneously to the inverted second input of AND gate 27 and to a delay timing circuit 28, which produces a constant timing period during which the reapplication of braking pressure is developed. The output signal of timing circuit 28 is fed via another timing circuit 30 to a conventional pulse generator 29, whose pulse signals are transmitted to the second input of AND gate 22. Timing circuit 30 maintains pulse generator 29 operative a predetermined period following expiration of the timing period provided by timer 28.

The output signal of AND gate 24 is transmitted to the second input of OR gate 21 whose output signals control energization of the solenoid valve 18 of an electro-pneumatic exhaust valve $M_A$ interposed in the delivery line of a brake cylinder device (not shown). In the energized state of solenoid 18, valve $M_A$ is actuated to a position connecting the brake cylinder device to atmosphere, and in the deenergized state, is actuated to a position interrupting this connection.

The output signal of the AND gates 22 and 27 are each connected to inputs of OR gate 19. The signal emitted by OR gate 19 is transmitted to the second input of AND gate 25 whose output signals control energization of solenoid 17 of an electro-pneumatic supply valve $M_E$ that controls the supply of fluid pressure to the brake cylinder (not shown). In the energized state, solenoid valve 17 causes actuation of supply valve $M_E$ to interrupt the supply of fluid pressure to the brake cylinder device and when deenergized, causes valve $M_E$ to supply fluid pressure to the brake cylinder.

Following initiation of a brake application on a road surface exhibiting a high coefficient of friction, for example, $0.8\mu$, the $-b$ signal appears when the wheel deceleration exceeds a certain threshold value selected. If the wheel velocity falls below a certain wheel velocity threshold, the $\Delta V$ signal appears concurrently with the $-b$ signal present. The $-b$ signal acts via OR gate 19 to energize solenoid 17 of valve $M_E$ which accordingly interrupts the connection between the wheel brake cylinder and the source of fluid pressure, and via OR gate 21 to energize solenoid 18 of valve $M_A$, which accordingly establishes communication between the wheel brake cylinder and atmosphere. The pressure in the wheel brake cylinder is thus released until the wheel deceleration again falls below the selected deceleration threshold and the $-b$ signal vanishes, in response to which solenoid 18 is deenergized and valve $M_A$ terminates any further reduction of brake cylinder pressure.

The inlet solenoid of valve $M_E$, however, continues to be excited due to presence of the $\Delta V$ signal acting via OR gate 19 to hold valve $M_E$ in its closed position. Now with both valves $M_{EL}$ and $M_{AL}$ closed, the brake cylinder pressure is held constant, while the wheel continues to turn in this holding phase. If the wheel acceleration subsequently exceeds a certain threshold value indicative of the wheel skid being corrected, the $+b$ signal appears concurrent with the $\Delta V$ signal, which keeps solenoid 17 of valve $M_E$ excited after the loss of the $\Delta V$ signal, as the wheel velocity threshold is exceeded. The $+b$ signal acts via the OR gate 20, timing circuit 26, AND gate 27, and OR gate 19 at this time to maintain solenoid 17 energized in the absence of the $\Delta V$ signal.

If the wheel acceleration falls below the acceleration threshold, the $+b$ signal vanishes. The timing circuit 26, however, maintains its output signal at the one input of AND gate 27 over a time period $Z_1$ sufficient for the following regulating process to take place. Since no $+b$ signal arises at the correspondingly inverted input of AND gate 23, the AND gate 23 is enabled and transmits a signal to the inverted input of AND gate 27, which accordingly becomes disabled. The signal emitted by AND gate 23 also excites timing circuit 28. Until the short time delay $Z_2$ determined by this timing circuit 28 has lapsed, there is no signal presented to AND gate 22 via pulse generator 29. Accordingly all inputs at OR gate 19 are absent and solenoid 17 of valve $M_E$ is deenergized. Since solenoid 18 of valve $M_{AL}$ is also deenergized, valves $M_E$ and $M_A$ are positioned to establish reapplication of fluid brake pressure according to a predetermined brake pressure buildup curve.

After the time delay $Z_2$ has passed, timing circuit 28 transmits an output signal to timing circuit 30, the output of which drives pulse generator 29 for a time period $Z_3$. The output of pulse generator 29 acts through AND gate 22 and OR gate 19 to energize solenoid 17 of valve $M_E$ and accordingly terminate the continuous reapplication of brake pressure and initiate instead a pulsed phase of reapplication brake pressure. In this pulsed phase, AND gate 22 is periodically disabled and enabled to respectively open and close supply valve $M_E$ so that the braking pressure builds up with a more shallow slope and the wheel velocity curve $V_R$ in FIG. 1 progresses along the theoretical reference velocity curve $V_{REF}$ representing the best possible utilization of braking force. A new regulating process begins upon the appearance of the next $-b$ signal.

In the pressure versus time curve of FIG. 1, the reapplication pressure has been shown as reaching a level sufficient to generate the next deceleration signal $-b$ before the pulse phase of reapplication pressure becomes effective for purposes of clarity.

Since it has been assumed that the vehicle is operating on a road having a high coefficient of friction, it will be understood that the acceleration signal $+b$ will arise before time period $Z_4$ expires following disappearance of deceleration signal $-b$, which initiated operation of the timer 6 at the time the deceleration signal first occurred. Accordingly, acceleration signal $+b$ is effective to initiate operation of timer 7, whose output is effective to disable AND gate 8 upon expiration of time period $Z_4$ of timer 6. The absence of an output from AND gate 8 disables AND gate 3 to prevent low threshold acceleration signal $+b_1$ from influencing evaluation circuit 5, which is instead influenced by acceleration signal $+b$ to establish the reapplication of brake pressure in accordance with the usual operation of such antiskid brake control systems according to the curves of FIG. 1 under the higher of the coefficients of friction represented by $0.8\mu$.

Assume now that the condition of the roadway has deteriorated to such extent that a substantial reduction in the coefficient of friction to $0.2\mu$ has occurred, as represented in FIG. 1. Appearance of a deceleration signal $-b$ when a wheel is detected as decelerating in excess of a predetermined skid threshold will activate timer 6, while concurrently influencing evaluation circuit 5 to effect a brake pressure reduction, as previously described. The output of timer 6 disables AND gate 8. In the absence of an output from the disabled AND gate 8, AND gate 3 is likewise disabled. Now since the velocity signal $\Delta V$ arises during the wheel deceleration, the brake pressure will be maintained in a holding phase upon disappearance of deceleration signal $-b$ at the time the wheel deceleration falls below the skid threshold, as previously described, to allow the wheel to subsequently reaccelerate to synchronous speed. This so-called holding phase may be construed as a period during which a gradual stepping down or a gradual pressure rise occurs, as provided in other known antiskid systems during the wheel reacceleration, as well as a holding constant of the brake pressure as provided in the present system.

Due to the low road adhesion, the rate of acceleration at this time may be insufficient to generate acceleration signal $+b$, as shown by the fact that the acceleration curve in FIG. 1 lies below the $+b$ threshold during the second and additional cycles of the graph. Acceleration signal $+b_1$ occurs at a lower rate threshold than signal $+b$, but is blocked at AND gate 3 during the timing period $Z_4$ of timer 6 to allow time for acceleration signal $+b$ to arise. Failure of signal $+b$ to arise within time period $Z_4$ is an indication of the low road adhesion and results in AND gate 8 becoming enabled to in turn enable AND gate 3. The low threshold acceleration signal $+b_1$ is thus passed by AND gate 3 to OR gate 4 and ultimately to the evaluation circuit 5, where it maintains AND gate 23 in a disabled state. The absence of an output from AND gate 23 in turn enables AND gate 27, which acts via OR gate 19 to maintain energization of solenoid 17 of supply valve $M_E$ and accordingly maintain a continuation of the holding phase of brake pressure for an extended period. It is to be understood that without this provision for providing low threshold acceleration signal $+b_1$ in the absence of a high threshold acceleration signal $+b$, brake pressure would be prematurely reapplied upon cessation of the $\Delta V$ signal, and the reference velocity signal $V_{REF}$ would begin to deviate from the actual vehicle velocity represented by curve $V_F$, in FIG. 1. By extending the duration of the holding phase, in accordance with which the brake pressure is held constant, the slowly accelerating wheel is permitted to substantially regain synchronous rotation and the reference velocity signal formed from the wheel velocity $V_R$ is a more accurate approximation of the actual vehicle velocity, thereby assuring the integrity of the antiskid control system for the duration of a stop.

In the alternate embodiment of the invention shown in FIG. 3, sensing of a road surface having a low coefficient of friction is accomplished by reason of the fact that a deceleration signal $-b$ arises when only a relatively low value of brake pressure is present. In this embodiment of the invention, parts identified by the same reference numerals and letters used in FIG. 2 are identical.

The system includes an axle generator device G, a frequency to voltage transducer 9 and differentiator D, as described relative to the FIG. 2 embodiment. The output of differentiator D is connected to a deceleration threshold detector 31, an acceleration threshold detector 32 and a low acceleration threshold detector 2. These threshold detectors may be conventional Schmitt Trigger circuits for providing deceleration signal $-b$, acceleration signal $+b$ and acceleration signal $+b_1$. The deceleration signal emitted by threshold detector 31 is connected to evaluation circuit 5 for control of solenoid 17 of supply valve $M_E$ and solenoid 18 of exhaust valve $M_A$, as previously explained. The $\Delta V$ signal corresponding to the wheel velocity is also connected to evaluation circuit 5 via conductor 1, as is the output of OR gate 4.

One input of OR gate 4 is connected to the output of acceleration threshold detector 32, while the output of deceleration threshold detector 31 is connected to a first input of a bistable memory device 33, such as a suitable type flip-flop. A second input of memory device 33 is connected to the output of a pressure switch 35 having a source of energy 34. The brake pressure prevailing in the wheel brake cylinder (not shown) controls operation of pressure switch 35 in accordance with its set switching point. The output of memory device 33 is connected to an inverted input of an AND gate 36, whose other inputs are connected to the output of low threshold acceleration detector 2 and the output of a timer 38 having a predetermined time period $Z_6$ that prevails after the timer is inactivated.

Timer 38 is activated by the output of an OR gate 37 to which the respective current signals of the left and right front and left and right rear solenoids 18 of the wheel exhaust valves $M_A$ are connected.

In operation, it will be seen that a brake application on a roadway affording good adhesion characteristics will permit development of brake pressure to a level in excess of the predetermined switching point of pressure switch 35 before the wheel deceleration exceeds a skid threshold, as indicated by the appearance of deceleration signal $-b$. This results in pressure switch 35 being closed to provide a signal at the second input of memory device 33. When deceleration signal $-b$ does appear, the memory device 33 is switched to a condition in which the pressure switch signal is connected to the output of the memory device and maintained until both the deceleration signal $-b$ and pressure switch signal disappear.

The output signal of memory device 33 disables AND gate 36 to prevent passage of the low threshold acceleration signal at this time since the good road adhesion will permit normal wheel reacceleration.

If it is assumed now that braking is undertaken on a road having a low or poor adhesion characteristic, the wheel deceleration will exceed the deceleration threshold established by threshold detector 31 and accordingly provide deceleration signal $-b$ before sufficient brake pressure has developed to effect closure of pressure switch 35. The absence of the pressure switch signal at the second input of memory device 33 when switched to its set position by the $-b$ signal removes the disabling signal at the inverted input of AND gate 36. Concurrently, timer 38 is activated by the energizing signal to the solenoid valve 18 of whichever wheel is decelerating at a rate exceeding the skid threshold, thereby enabling AND gate 36, which accordingly passes the low threshold acceleration signal to the evaluation circuit 5 via OR gate 5 for a duration $Z_6$ following termination of deceleration signal $-b$. As explained in the operation of the antiskid system of FIG. 2, the low threshold acceleration signal $+b_1$ influences the evaluation circuit such as to maintain a holding phase of brake pressure until such time as the $+b_1$ signal disappears or timing period $Z_4$ elapses.

Having now described the invention what we claim as new and desire to secure by Letters Patent, is:

1. An antiskid brake control system for a vehicle having brake means subject to operator controlled fluid brake pressure, wherein modulation of the operator controlled brake pressure at each individual wheel is accomplished according to the dynamic condition of the respective wheel, said system comprising:

a. means for generating a speed signal of a wheel according to its angular velocity;
   b. means for differentiating said wheel speed signal to provide an output signal having an amplitude proportional to the rate of change of said wheel speed signal;
   c. means subject to said output signal for providing a deceleration signal when the wheel deceleration exceeds a preselected deceleration threshold;
   d. means subject to said output signal for providing a first acceleration signal when the wheel acceleration exceeds a preselected acceleration threshold;
   e. means subject to said output signal for providing a second acceleration signal when the wheel acceleration exceeds a preselected acceleration threshold lying below the acceleration threshold of said first acceleration signal;
   f. first valve means with each wheel for controlling the delivery of the operator controlled fluid brake pressure to said brake means thereof;
   g. second valve means with each wheel for controlling the release of fluid brake pressure from said brake means thereof;
   h. wheel behavior evaluation means subject to said deceleration signal for concurrently effecting operation of said first and second valve means in such sense as to respectively cut off the delivery of brake pressure to said valve means and release brake pressure from said valve means;
   i. means for providing a velocity signal when said speed signal is a predetermined amount less than a reference signal approximating actual vehicle velocity, said reference signal corresponding to said speed signal until said deceleration signal arises, at which point said reference signal decreases in accordance with a predetermined time constant.
   j. said wheel behavior means being operative upon disappearance of said deceleration signal to cause said second valve means to terminate the release of brake pressure and being further operative responsive to either said velocity signal or one of said first and second acceleration signals to cause said first valve means to remain operative in such sense as to continue interrupting delivery of operator controlled brake pressure to said brake means whereby the fluid brake pressure is maintained constant in a holding phase of brake control; and
   k. control means for establishing connection of said second acceleration signal with said wheel behavior evaluation means when said first acceleration signal fails to arise within a predetermined time period following expiration of said deceleration signal in order to delay reapplication of operator controlled fluid brake pressure to said brake means by said first valve means following termination of said velocity signal; said control means comprising:
i. an OR gate subject to said first and second acceleration signals and having an output connected to said wheel behavior evaluation means;
ii. an AND gate via which said second acceleration signal is connected to said OR gate;
iii. means for providing said predetermined time period during which a time signal is established;
iv. second AND gate means subject to said time signal and said first acceleration signal and having an output connected to said first AND gate to enable said first AND gate in the absence of said first acceleration signal only when said predetermined time period has expired.

* * * * *